US009346217B2

(12) United States Patent
Huang et al.

(10) Patent No.: US 9,346,217 B2
(45) Date of Patent: May 24, 2016

(54) THREE-DIMENSIONAL PRINTING APPARATUS

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Chen-Fu Huang, New Taipei (TW); An-Hsiu Lee, New Taipei (TW); Hao-Jen Huang, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 31 days.

(21) Appl. No.: 14/487,097

(22) Filed: Sep. 16, 2014

(65) Prior Publication Data

US 2015/0375452 A1 Dec. 31, 2015

(30) Foreign Application Priority Data

Jun. 26, 2014 (TW) .............................. 103122124 A

(51) Int. Cl.
*B29C 67/00* (2006.01)
*B33Y 10/00* (2015.01)
B33Y 30/00 (2015.01)
B29L 9/00 (2006.01)

(52) U.S. Cl.
CPC ......... *B29C 67/0062* (2013.01); *B29C 67/0085* (2013.01); *B33Y 10/00* (2014.12); *B29L 2009/00* (2013.01); *B33Y 30/00* (2014.12)

(58) Field of Classification Search
CPC . B29C 67/0055; B29C 67/0085; B33Y 50/02
USPC ................................................. 264/494, 496
See application file for complete search history.

(56) References Cited

U.S. PATENT DOCUMENTS

| 3,208,169 | A | * | 9/1965 | Buchner | D06F 65/06 38/61 |
|---|---|---|---|---|---|
| 3,521,442 | A | * | 7/1970 | Umezawa | G04C 1/065 200/38 R |
| 5,573,721 | A | * | 11/1996 | Gillette | B29C 41/12 118/100 |
| 8,465,689 | B2 | | 6/2013 | Sperry et al. | |
| 2015/0064298 | A1 | * | 3/2015 | Syao | B29C 67/0062 425/169 |

* cited by examiner

*Primary Examiner* — Alison L Hindenlang
*Assistant Examiner* — Mohamed K Ahmed Ali
(74) *Attorney, Agent, or Firm* — Jianq Chyun IP Office

(57) ABSTRACT

A three-dimensional printing apparatus including a swing tank containing a liquid formation material, a swing mechanism, an elevating platform, a light source and a control unit is provided. The swing tank includes a pivot side and a swing side adapted to be swung about the pivot side. The swing mechanism includes a cam and a driving motor. The cam leans against the swing side for swinging the same. The elevating platform and the light source are respectively disposed above and below the swing tank. The control unit controls the elevating platform to immerge into the liquid formation material. The light source cures the liquid formation material between the elevating platform and the bottom of the swing tank. The control unit then controls the swing mechanism to swing the swing side, so the cured liquid formation material is separated from the bottom and located on the elevating platform.

12 Claims, 8 Drawing Sheets

THREE-DIMENSIONAL PRINTING APPARATUS

CROSS-REFERENCE TO RELATED APPLICATION

This application claims the priority benefit of Taiwan application serial no. 103122124, filed on Jun. 26, 2014. The entirety of the above-mentioned patent application is hereby incorporated by reference herein and made a part of this specification.

BACKGROUND

1. Technical Field

The invention relates to a printing apparatus, and particularly relates to a stereolithography three-dimensional printing apparatus.

2. Related Art

In recent years, along with rapid development of technology, different methods for constructing three-dimensional (3D) models by using additive manufacturing technology such as layer-by-layer model constructing, etc. have been developed. Generally, the additive manufacturing technology is to convert design data of a 3D model constructed by software of computer aided design (CAD), etc. into a plurality of continuously stacked thin (quasi two-dimensional (2D)) cross-section layers. Meanwhile, many technical means of forming the thin cross-section layers are gradually developed. For example, a printing module of a printing apparatus generally moves above a base along an XY plane according to spatial coordinates XYZ of the design data of the 3D model, such that a constructing material may form a correct shape of the cross-section layer. The deposited constructing material is then naturally cured, or is cured through heating or light source irradiation, so as to form the desired cross-section layer. Therefore, by moving the printing module layer-by-layer along a Z-axis, a plurality of the cross-section layers are gradually stacked along the Z-axis, and the constructing material forms a 3D object under a layer-by-layer curing condition.

Taking a stereolithography 3D printing apparatus as an example, an elevating platform is adapted to be immerged into a liquid formation material contained in a tank, and a light source module irradiates the liquid formation material that serves as the constructing material along the XY plane, such that the liquid formation material is cured due to light irradiation, and is stacked on the elevating platform layer-by-layer. In this way, by moving the elevating platform along the Z-axis layer-by-layer, the liquid formation material is cured layer-by-layer and is stacked on the elevating platform to form a 3D object. During a process of stacking the 3D object layer-by-layer, the cured liquid formation material is also adhered to the bottom of the tank, and if the elevating platform is moved, the cured liquid formation material adhered to the bottom of the tank is probably cracked or damaged. Moreover, if the cured liquid formation material is adhered to the bottom of the tank, it probably interferes with irradiation of the light source so as to influence a subsequent formation result. Therefore, under the existing 3D printing technique, how to achieve better printing quality of the 3D object printed by the 3D printing apparatus gradually draws attention of the related technicians of the field.

SUMMARY

The invention is directed to a 3D printing apparatus having better printing quality.

The invention provides a 3D printing apparatus including a swing tank, a swing mechanism, an elevating platform, a light source and a control unit. The swing tank is configured to contain a liquid formation material. The swing tank includes a pivot side and a swing side. The swing side is adapted to swing about the pivot side. The swing mechanism includes a cam and a driving motor. The cam is disposed at the swing side and includes at least one protruding edge. The cam leans against the swing side, and rotates to swing the swing side up and down through the at least one protruding edge. The driving motor is configured to drive the cam to rotate. The elevating platform is movably disposed above the swing tank. The light source is disposed below the swing tank to irradiate and cure the liquid formation material. The control unit is coupled to the light source, the swing mechanism and the elevating platform. The control unit controls the elevating platform to immerge into the liquid formation material by an initial depth. The light source irradiates and cures the liquid formation material between the elevating platform and a bottom of the swing tank. The control unit controls the swing mechanism to drive the swing side to swing, such that the cured liquid formation material is separated from the bottom and is located on the elevating platform, and the cured liquid formation material is stacked on the elevating platform layer-by-layer to from a 3D object.

According to the above descriptions, the swing mechanism is disposed on the swing side of the swing tank, and the cam of the swing mechanism leans against the swing side, such that the cam drives the swing side of the swing tank to swing when the cam rotates. In this way, the cured liquid formation material is easily separated from the bottom of the swing tank by swing the swing side of the swing tank, so as to avoid a situation that the cured liquid formation material is adhered to the bottom of the swing tank and is cracked when the elevating platform is elevated, and avoid influencing subsequent printing quality due to that the cured liquid formation material is adhered to the bottom of the swing tank. Therefore, the printing quality of the 3D printing apparatus of the invention is indeed improved.

Moreover, the driving motor is used to drive the cam to rotate, therefore, after the cam is rotated to a fixed position, the 3D printing apparatus is capable of maintaining the swing side of the swing tank to a current position without continually powering the driving motor, so as to decrease maintenance and operation cost. In addition, since the 3D printing apparatus of the invention does not need to continually power the driving motor after the cam is rotated to the fixed position, the heat produced by the driving motor is effectively controlled, so that reliability and security of the 3D printing apparatus are enhanced.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
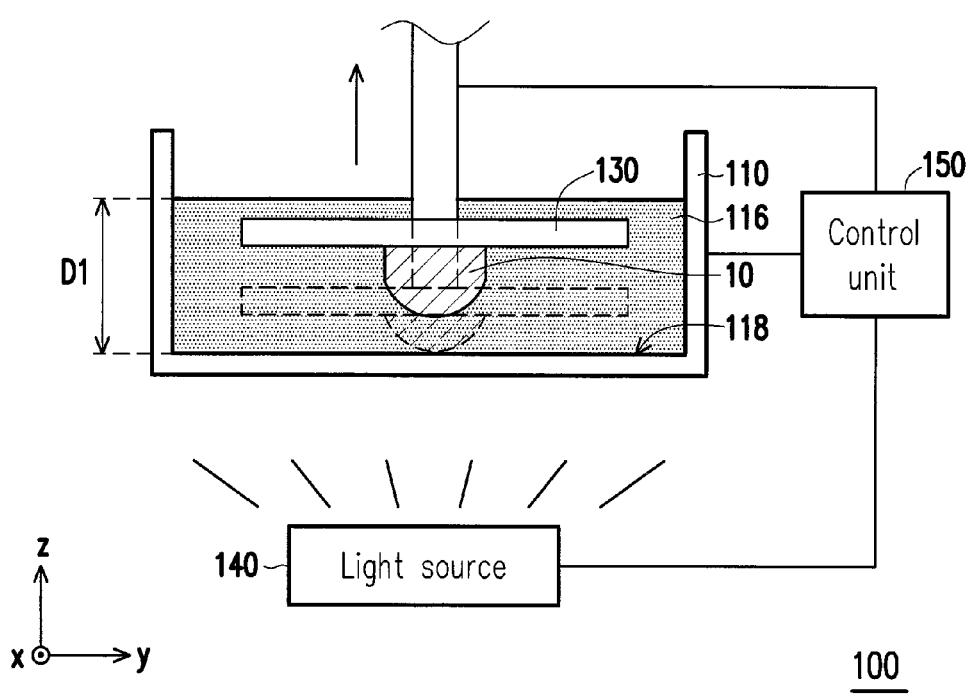
FIG. 1 is a schematic diagram of a 3D printing apparatus according to an embodiment of the invention.

The present invention will now be described more fully with reference to the accompanying drawings, in which exemplary embodiments of the invention are shown. The terms used herein such as "above", "below", "front", "back", "left" and "right" are for the purpose of describing directions in the figures only and are not intended to be limiting of the invention. Moreover, in the following embodiments, the same reference numbers are used in the drawings and the description to refer to the same or like parts.

Figure 2:
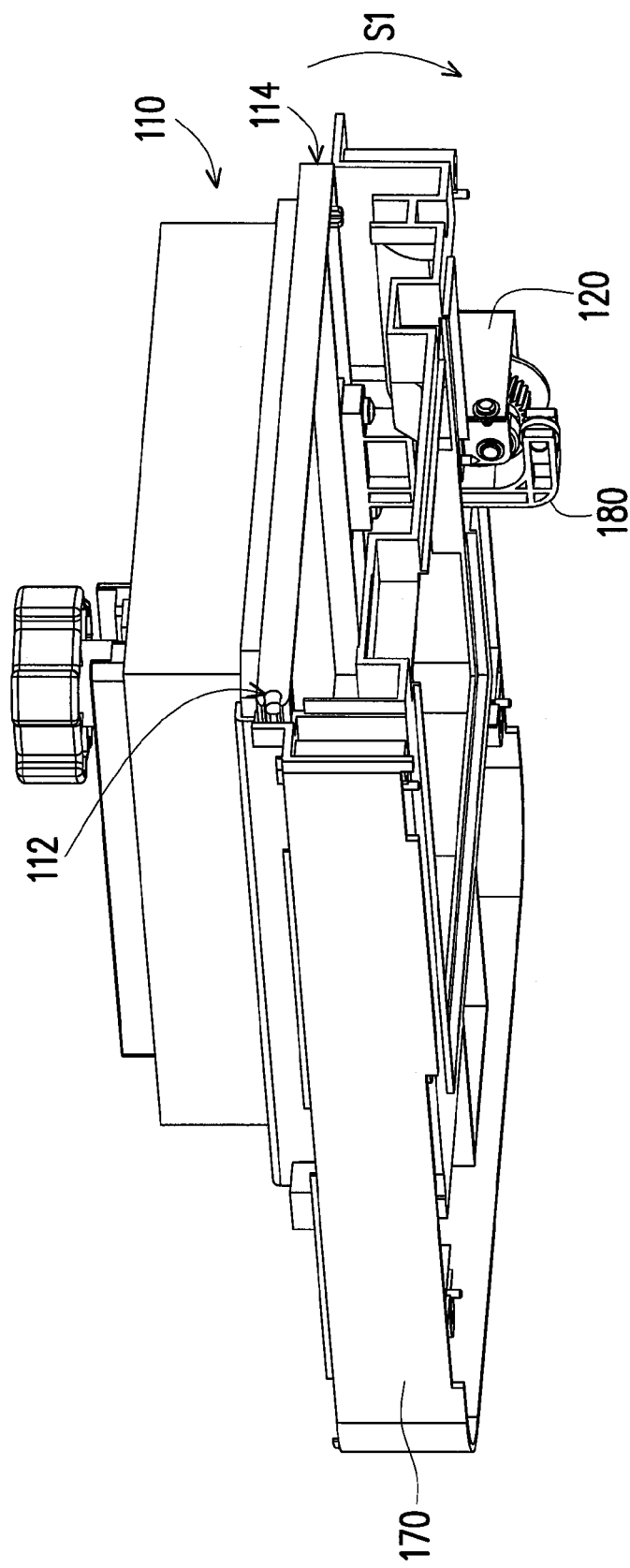
FIG. 2 is a three-dimensional view of a swing tank according to an embodiment of the invention.

FIG. 1 is a schematic diagram of a 3D printing apparatus according to an embodiment of the invention. FIG. 2 is a three-dimensional view of a swing tank according to an embodiment of the invention. Referring to FIG. 1 and FIG. 2, the 3D printing apparatus 100 of the present embodiment is adapted to print a 3D object 10 according to digital 3D model information. The 3D printing apparatus 100 includes a swing tank 110, a swing mechanism 120, an elevating platform 130, a light source 140 and a control unit 150. In the present embodiment, the control unit 150 is used for reading a digital 3D model, and is coupled to the light source 140, the swing mechanism 120 and the elevating platform 130, so as to control operations of the swing mechanism 120, the elevating platform 130 and the light source 140 according to the digital 3D model. In the present embodiment, the digital 3D model can be a digital 3D image file, which is, for example, built by a computer host through computer-aided design (CAD) or animation modelling software, etc.

In the present embodiment, the swing tank 110 is configured to contain a liquid formation material 116, and the elevating platform 130 is movably disposed above the swing tank 110, and is adapted to move close to the swing tank to immerge into the liquid formation material 116. The light source 140 is disposed under the swing tank 110, and is configured to irradiate and cure a specific portion of the liquid formation material 116. The 3D printing apparatus 100 is adapted to read the aforementioned digital 3D model, and slices the digital 3D model into a plurality of cross-sections. The control unit 150 controls to print the 3D object 10 layer-by-layer according to the cross-sections of the digital 3D model, and the 3D object 10 is obtained by irradiating and curing the liquid formation material 116 through the light source 140.

In detail, in the present embodiment, the elevating platform 130 is disposed above the swing tank 110, and is adapted to move relative to the swing tank 110 along an axial direction, where the axial direction is, for example, perpendicular to a liquid surfaces of the liquid formation material 116. For example, in FIG. 1, the elevating platform 130 is adapted to move along the Z-axis to immerge into the liquid formation material 116 contained in the swing tank 110. In the present embodiment, the elevating platform 130 has a carrying surface used for carrying the 3D object 10, where the carrying surface faces the light source 140. The light source 140 is disposed under the swing tank 110, and the light source 140 includes a laser component and/or a oscillating mirror module. The laser component is adapted to emit a laser light, and the oscillating mirror module is adapted to reflect the laser light to the liquid formation material 116. However, the type and composition of the light source 140 is not limited by the invention. In the present embodiment, the liquid formation material 116 is, for example, a photosensitive resin or other suitable light curing materials, and the liquid formation material 116 is cured after being irradiated by the light source 140. The control unit 150 controls the elevating platform 130 to immerge into the liquid formation material 116 by an initial depth D1, and controls the elevating platform 130 to move layer-by-layer in the liquid formation material 116 from the initial depth D1 along a direction away from the light source 140, and controls the light source 140 to irradiate the liquid formation material 116 located between the elevating platform 130 and a bottom 118 of the swing tank 110 by layers, so as to cure a irradiated part of the liquid formation material 116 by layers, such that the liquid formation material 116 is stacked layer-by-layer on the carrying surface of the elevating platform 130 to form the 3D object 10.

According to the above description, since the liquid formation material 116 is cured between the elevating platform 130 and the bottom 118 of the swing tank 110, the cured liquid formation material 116 is probably adhered to the bottom 118 of the swing tank 110. Therefore, in order to avoid crack of the cured liquid formation material 116 that is adhered to the bottom 118 when the elevating platform 130 is elevated, or in order to prevent the cured liquid formation material 116 from adhering to the bottom 118 to influence the irradiation of the light source 140, the swing tank 110 of the present embodiment further includes a pivot side 112 and a swing side 114 as that shown in FIG. 2, wherein the swing side 114 is adapted to be driven by the swing mechanism 120 to swing about the pivot side 112 along a swing direction S1. In this way, after the control unit 150 controls the elevating platform 130 to immerge into the liquid formation material 116 by a predetermined depth, and controls the light source 140 to irradiate and cure the liquid formation material 116 located between the elevating platform 130 and the bottom 118, the control unit 150 controls the swing mechanism 120 to drive the swing side 114 to swing along the swing direction S1, such that the cured liquid formation material 116 is completely separated from the bottom 118, and is located on the elevating platform 130 as shown in FIG. 1.

Figure 3:
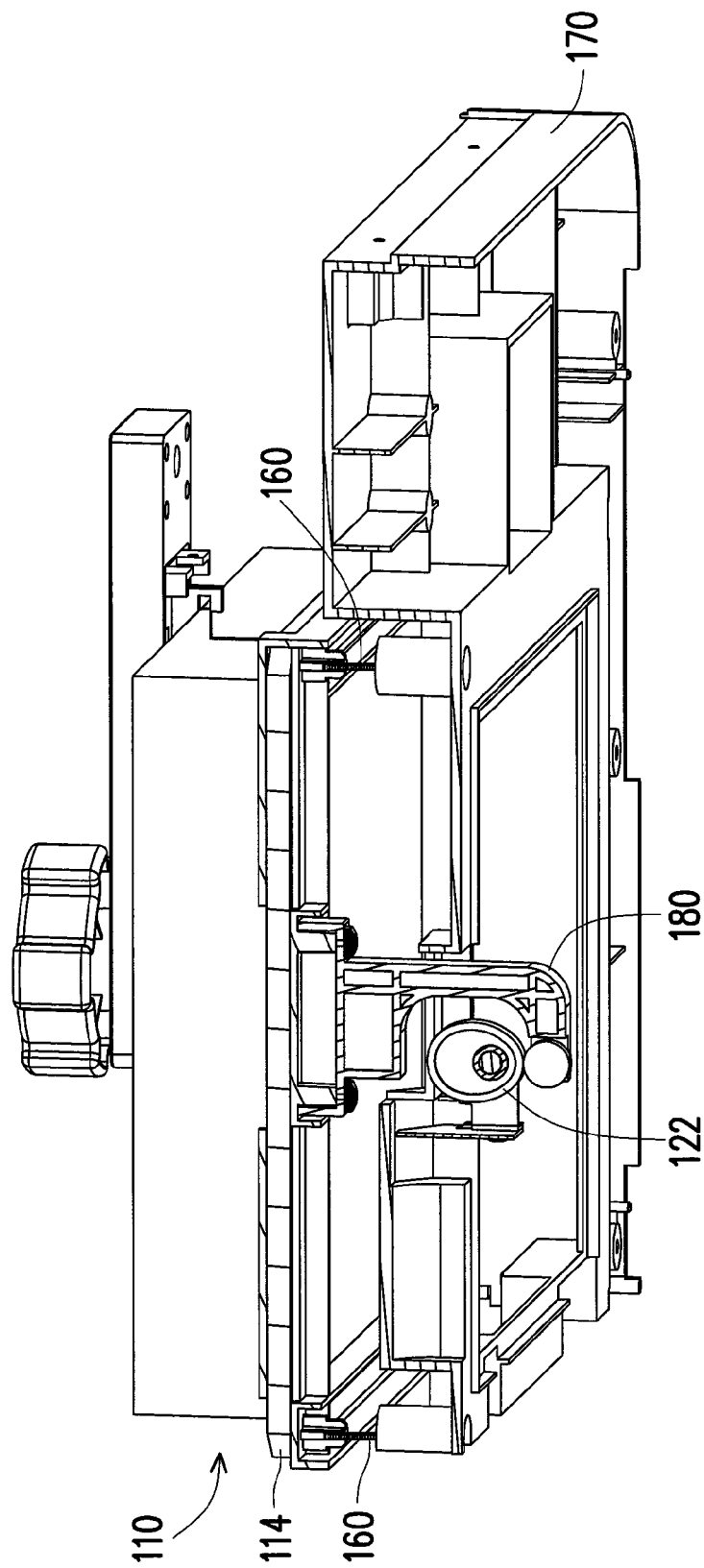
FIG. 3 is a cross-sectional view of a swing side of the swing tank of FIG. 2.
Figure 4:
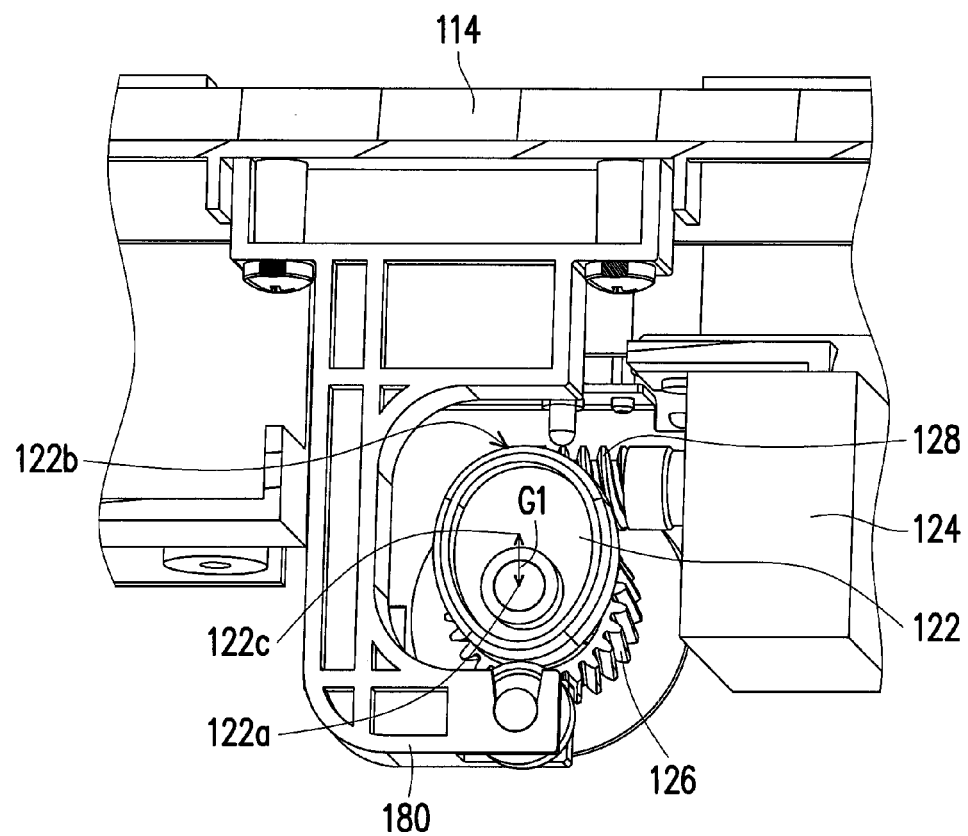
FIG. 4 is a partial enlarged view of a swing mechanism according to an embodiment of the invention.

FIG. 3 is a cross-sectional view of the swing side of the swing tank of FIG. 2. FIG. 4 is a partial enlarged view of the swing mechanism according to an embodiment of the invention. In detail, the swing mechanism 120 includes a cam 122 disposed at the swing side 114 and a driving motor 124 used for driving the cam 122 to rotate. The cam 122 includes at least one protruding edge 122b (one protruding edge is illustrated in FIG. 4) and a shaft 122a. The cam 122 leans against the swing side 114, and rotates to swing the swing side 114 up and down through the protruding edge 122b. In the present embodiment, the cam 122 is an eccentric cam having one protruding edge 122b, and the shaft 122a and a centroid of the cam 122 has a gap G1 there between. The cam 122 leans against the swing side 114, such that when the cam 122 rotates by one cycle, the protruding edge 122b can drive the swing side 114 to swing up and down for once.

Figure 5:
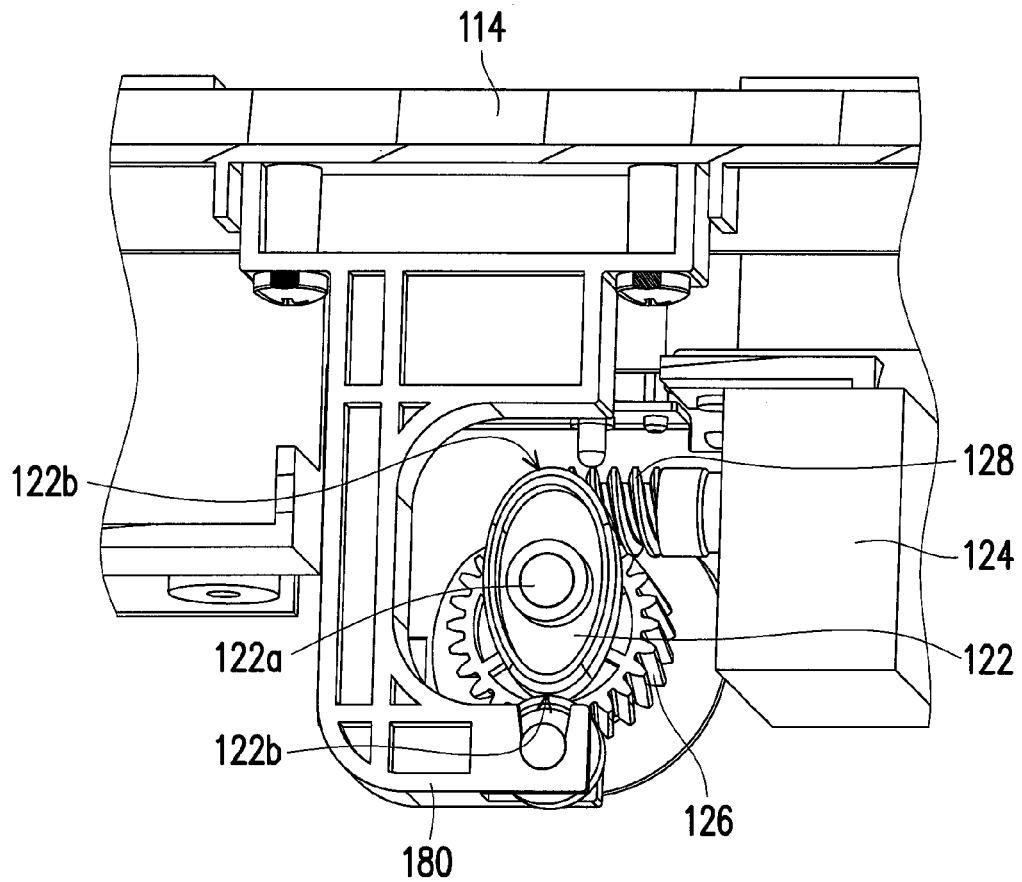
FIG. 5 is a partial enlarged view of a swing mechanism according to another embodiment of the invention.

FIG. 5 is a partial enlarged view of the swing mechanism according to another embodiment of the invention. It should be noticed that, the swing mechanism 120 of the present embodiment is similar to the swing mechanism 120 of FIG. 4, and reference numbers of the components and a part of contents of the aforementioned embodiment are also used in the present embodiment, where the same reference numbers denote the same or like components, and descriptions of the same technical contents are omitted. The aforementioned embodiment can be referred for descriptions of the omitted parts, and detailed descriptions thereof are not repeated in the following embodiment. Referring to FIG. 5, differences between the swing mechanism 120 of the present embodiment and the swing mechanism 120 of FIG. 4 are described below.

The swing mechanism 120 of the present embodiment also includes the cam 122 disposed at the swing side 114 and the driving motor 124 used for driving the cam 122 to rotate, though the cam 122 of the present embodiment includes a plurality of protruding edges 122b as shown in FIG. 5 (two protruding edges 122b disposed in symmetry are illustrated in FIG. 5), where the cam 122 leans against the swing side 114, and rotates to swing the swing side 114 up and down for multiple times through the protruding edges 122b. In the present embodiment, the number of the protruding edges 122b is two, and the protruding edges 122b are disposed in symmetry. Under such configuration, the cam 122 may be in an elliptic shape, and the two protruding edges 122b are located at two opposite ends of a long axis of the ellipse. The cam 122 leans against the swing side 114. In this way, when the cam 122 rotates by one cycle, the two protruding edges 122b can drive the swing side 114 to swing up and down for twice. It should be noticed that since the cam 122 drives the swing side 114 to swing up and down through the protruding edges 122b, the number of the protruding edges 122b is equal to the number of times that the protruding edges 122b drive the swing side 114 to swing up and down when the cam 122 rotates by one cycle. The user can design the number of the protruding edges according to actual product requirement.

In detail, the 3D printing apparatus 100 may further include a mounting rack. The pivot side 112 is pivoted to the mounting rack 170 as that shown in FIG. 2, such that the swing side 114 is adapted to swing about the pivot side 112 along the swing direction S1. The driving motor 124 is fixed on the mounting rack 170. Further, the 3D printing apparatus 100 may further include a bracket 180 disposed at the swing side 114. The cam 122 is disposed in the bracket 180 as that shown in FIG. 4 or FIG. 5, and an outer edge thereof leans against the bracket 180. In this way, due to an eccentric configuration of the shaft 122a, the outer edge located further away from the shaft 122a presses down the bracket 180 during the rotation of the cam 120, and drives the bracket 180 to move along a direction shown by arrows in FIG. 4, and the bracket 180 is locked to the swing side 114 as that shown in FIG. 3, such that the bracket 180 can drive the swing side 114 of the swing tank 110 to swing about the pivot side 112 along the swing direction S1 as that shown in FIG. 2.

Figure 6:
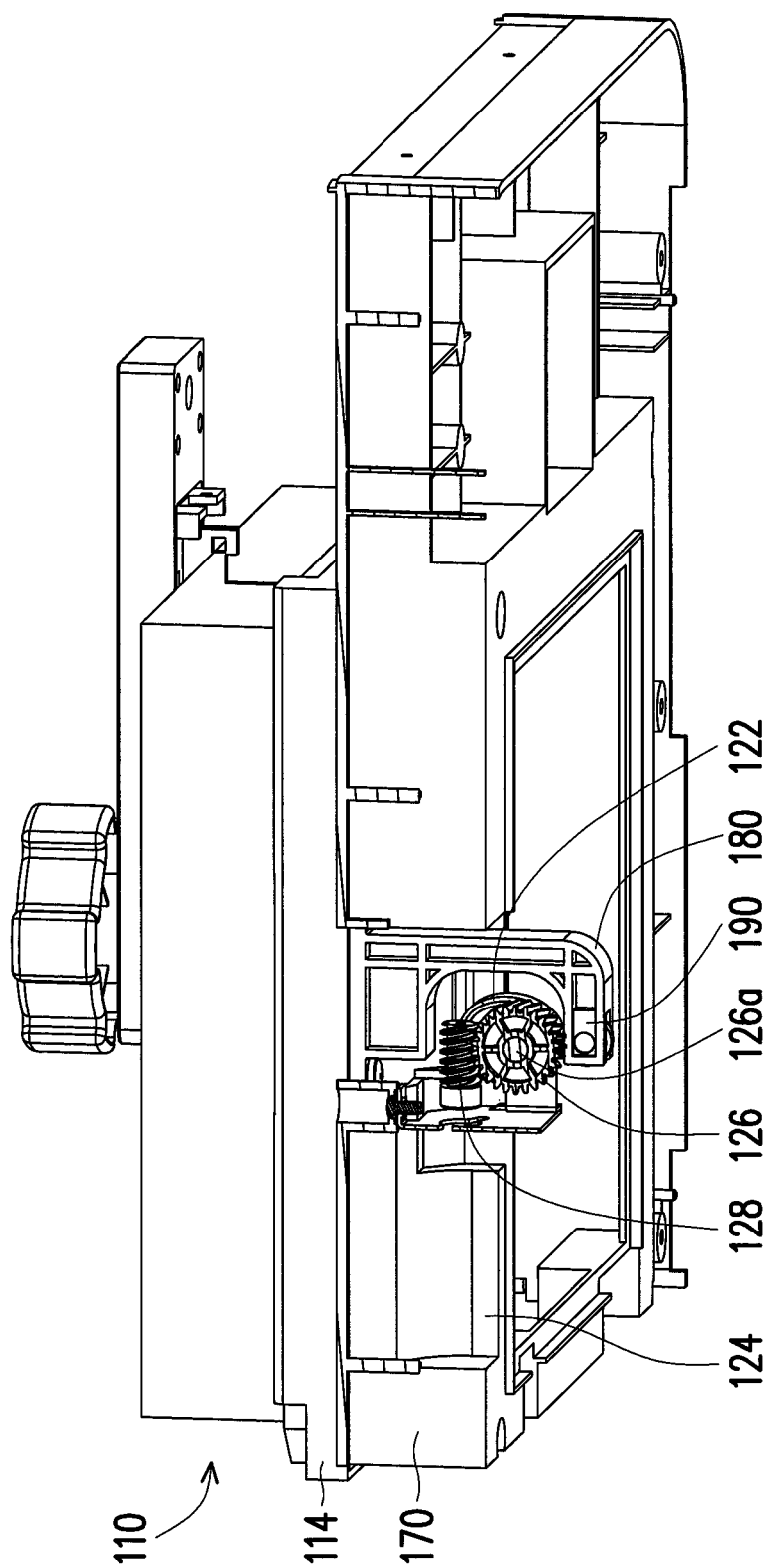
FIG. 6 is a three-dimensional view of the swing side of the swing tank of FIG. 2.

FIG. 6 is a three-dimensional view of the swing side of the swing tank of FIG. 2. Further, the 3D printing apparatus 100 further includes a driving gear 126 and a worm 128. The driving gear 126 includes a driving shaft 126a, where the driving shaft 126a is connected to the shaft 122a of the cam 122 shown in FIG. 4 or FIG. 5, such that the cam 122 can rotate along with rotation of the driving gear 126. The worm 128 is connected to the driving motor 124 and is engaged with the driving gear 126 as that shown in FIG. 6. The driving motor 124 is configured to drive the worm 128 to rotate, and the worm 128 drives the driving gear 126 to rotate, such that the driving gear 126 drives the cam 122 to rotate. In this way, the cam 122 can be driven to rotate based on the characteristic that the driving motor 124 drives the worm 128, so as to drive the swing side 114 of the swing tank 110 to swing.

Moreover, in the present embodiment, the 3D printing apparatus 100 may further include a sensing component 190 configured to sense a position of the swing side 114, and the control unit 150 determines whether to control the driving motor 124 to drive the cam 122 to rotate according to a sensing result of the sensing component 190. In detail, according to a position of the swing side 114 sensed by the sensing component 190, the control unit 150 determines whether to control the driving motor 124 to drive the cam 122 to rotate to adjust the position of the swing side 114. Under such configuration, in the present embodiment, since the driving motor 124 is configured to drive the worm 128 to drive the cam 122 to rotate, after the sensing component 190 senses that the cam 122 is rotated to a fixed position, the 3D printing apparatus 100 is capable of maintaining the swing side 114 of the swing tank 110 to a current position without continually powering the driving motor 124, so as to decrease maintenance and operation cost. In addition, since the driving motor 124 is unnecessary to be continuously powered after the cam 122 is rotated to the fixed position, the heat produced by the driving motor 124 is effectively controlled, so that reliability and security of the 3D printing apparatus 100 are enhanced.

Figure 7:
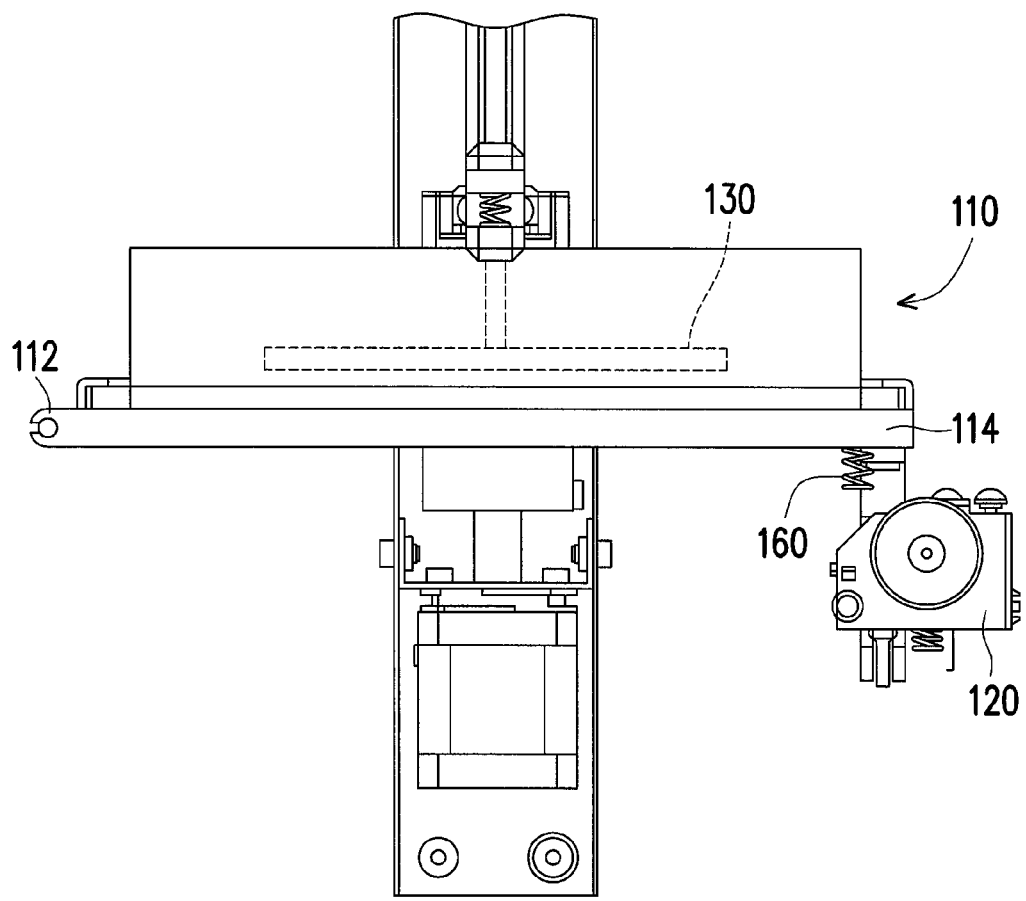
FIG. 7 is a schematic diagram of a swing tank in a printing state according to an embodiment of the invention.
Figure 8:
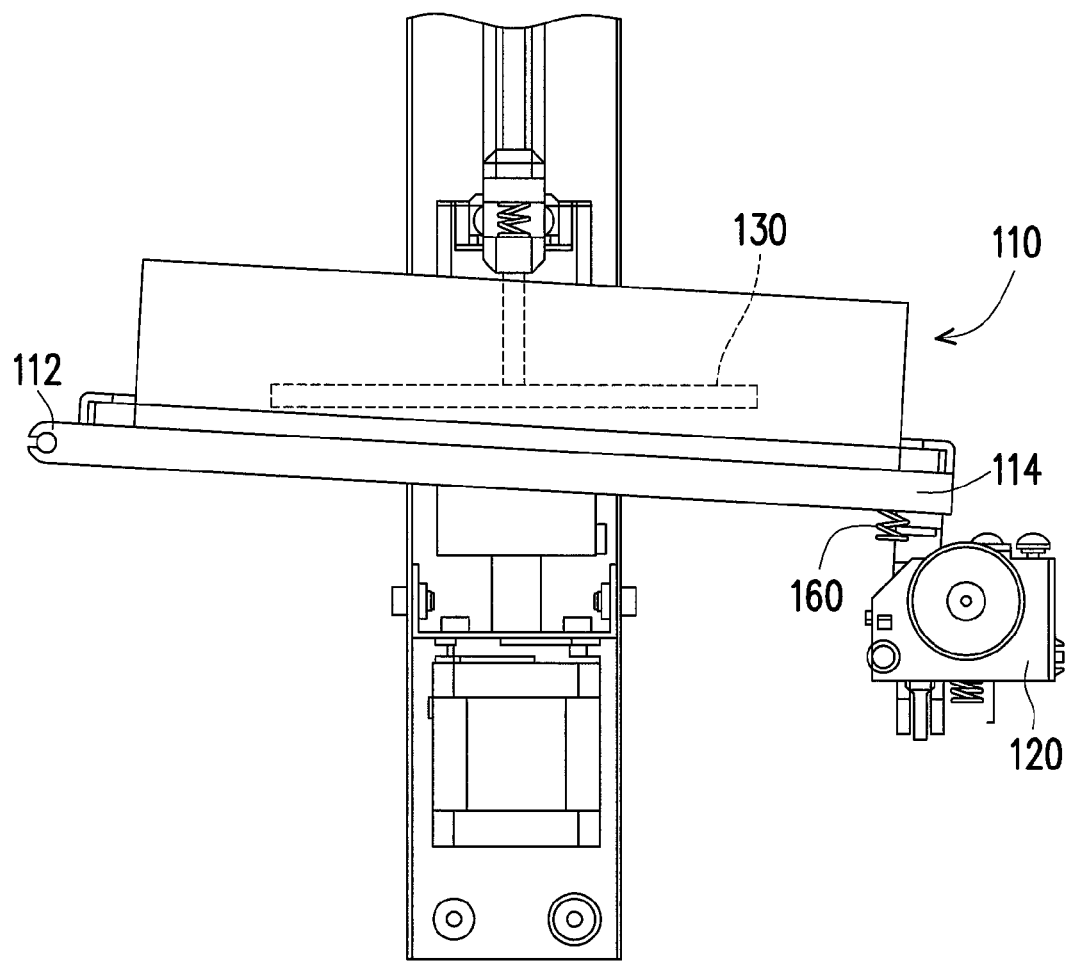
FIG. 8 is a schematic diagram of a swing tank in a swing state according to an embodiment of the invention.

FIG. 7 is a schematic diagram of the swing tank in a printing state according to an embodiment of the invention. FIG. 8 is a schematic diagram of the swing tank in a swing state according to an embodiment of the invention. Referring to FIG. 7 and FIG. 8, the swing tank 110 presents the printing state shown in FIG. 7 when the 3D printing apparatus 100 is performing a printing task, wherein the swing side 114 and the pivot side 112 are located on a same horizontal plane, and after the light source irradiates and cures the irradiated part of the liquid formation material 116 between the elevating platform 130 and the bottom 118 of the swing tank 110, the cam 122 of the swing mechanism 120 drives the swing side 114 to swing away from the elevating platform 130, such that the swing side 114 is lower than the pivot side 112 relative to a horizontal plane (for example, the carrying surface of the elevating platform 130) shown in FIG. 8, so that the cured liquid formation material 116 can be easily separated from the bottom 118 of the swing tank 110.

Moreover, in the present embodiment, the 3D printing apparatus 100 further includes at least one elastic restore component 160 as that shown in FIG. 3, FIG. 7 and FIG. 8. It should be noticed that for simplicity's sake, the aforementioned mounting rack 170 is omitted in FIG. 7 and FIG. 8 in order to clearly present the elastic restore component 160. The elastic restore component 160 is disposed at the swing side 114, and after the swing mechanism 120 drives the swing side 114 to swing downwards, the elastic restore component 160 is compressed as that shown in FIG. 8 to produce an elastic restore force, such that after the downward pressure of the cam 122 on the swing side 114 is disappeared, the elastic restore component 160 can restore the swing side 114 to its original position through the elastic restore force thereof, i.e. the swing side 114 returns back to the position where the pivot side 112 and the swing side 114 are located on a same horizontal plane as that shown in FIG. 7.

In summary, the swing mechanism is disposed on the swing side of the swing tank, and the cam of the swing mechanism leans against the swing side, such that the cam drives the swing side of the swing tank to swing when the cam rotates. In this way, the 3D printing apparatus can swing the swing side of the swing tank to separate the cured liquid formation material from the bottom of the swing tank, so as to avoid a situation that the cured liquid formation material is adhered to the bottom of the swing tank and is cracked when the elevating platform is elevated, and avoid influencing subsequent printing quality due to that the cured liquid formation material is adhered to the bottom of the swing tank. Therefore, the printing quality of the 3D printing apparatus of the invention is indeed improved.

Moreover, the driving motor is used to drive the cam to rotate, therefore, after the cam is rotated to a fixed position, the 3D printing apparatus is capable of maintaining the swing side of the swing tank to the fixed position without continually powering the driving motor, so as to decrease maintenance and operation cost. In addition, since the 3D printing apparatus of the invention is unnecessary to continually power the driving motor after the cam is rotated to the fixed position, the heat produced by the driving motor is effectively controlled, so that reliability and security of the 3D printing apparatus are enhanced.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A three-dimensional printing apparatus, comprising:
    a swing tank, configured to contain a liquid formation material, and comprising a pivot side and a swing side, wherein the swing side is adapted to swing about the pivot side;
    a swing mechanism, comprising:
        a cam, disposed at the swing side and comprising a shaft and at least one protruding edge, wherein the cam leans against the swing side, and rotates to drive the swing side swinging up and down through the at least one protruding edge; and
        a driving motor, configured to drive the cam to rotate;
    an elevating platform, movably disposed above the swing tank;
    a light source, disposed below the swing tank to irradiate and cure a irradiated part of the liquid formation material; and
    a control unit, coupled to the light source, the swing mechanism and the elevating platform, wherein the control unit controls the elevating platform to immerge into the liquid formation material by an initial depth, the light source irradiates and cures the irradiated part of the liquid formation material between the elevating platform and a bottom of the swing tank, the control unit controls the swing mechanism to drive the swing side to swing, such that the cured liquid formation material is separated from the bottom and is located on the elevating platform, and the cured liquid formation material is stacked on the elevating platform layer-by-layer to from a three-dimensional object.

2. The three-dimensional printing apparatus as claimed in claim 1, further comprising:
    a driving gear, comprising a driving shaft, wherein the driving shaft is connected to the shaft, such that the cam is rotated with the driving gear; and
    a worm, connected to the driving motor and engaged with the driving gear, wherein the driving motor drives the worm to rotate, and the worm drives the driving gear to rotate.

3. The three-dimensional printing apparatus as claimed in claim 1, wherein the cam is an eccentric cam, and a gap exists between a centroid of the eccentric cam and the shaft.

4. The three-dimensional printing apparatus as claimed in claim 1, wherein the cam comprises a plurality of protruding edges disposed in symmetry, the shaft coincides with a centroid of the cam, and the cam drives the swing side to swing up and down for multiple times when the cam rotates by one cycle.

5. The three-dimensional printing apparatus as claimed in claim 1, wherein a number of the protruding edges is equal to a number of times that the cam drives the swing side to swing up and down when the cam rotates by one cycle.

6. The three-dimensional printing apparatus as claimed in claim 1, wherein the cam drives the swing side to swing away from the elevating platform, such that the swing side is lower than the pivot side relative to a horizontal plane.

7. The three-dimensional printing apparatus as claimed in claim 1, further comprising at least one elastic restore component disposed at the swing side, wherein the elastic restore component restores the swing side to its original position after the swing mechanism drives the swing side to swing, such that the swing side and the pivot side are located on a same horizontal plane.

8. The three-dimensional printing apparatus as claimed in claim 1, further comprising a mounting rack, wherein the pivot side is pivoted to the mounting rack, and the swing side is adapted to swing about the pivot side.

9. The three-dimensional printing apparatus as claimed in claim 8, wherein the driving motor is fixed on the mounting rack.

10. The three-dimensional printing apparatus as claimed in claim 1, further comprising a bracket disposed at the swing side, wherein the cam is disposed in the bracket, and the protruding edge leans against the bracket, so as to drive the bracket to swing when the cam rotates.

11. The three-dimensional printing apparatus as claimed in claim 1, further comprising a sensing component, configured to sense a position of the swing side.

12. The three-dimensional printing apparatus as claimed in claim 11, wherein the control unit determines whether to control the driving motor to drive the cam to rotate according to a sensing result of the sensing component.

* * * * *